United States Patent
Williams

(10) Patent No.: US 12,407,749 B2
(45) Date of Patent: Sep. 2, 2025

(54) SYSTEMS AND METHODS FOR STATELESS MANAGEMENT OF A VIRTUALIZATION PLATFORM

(71) Applicant: JPMORGAN CHASE BANK, N.A., New York, NY (US)

(72) Inventor: Steven Williams, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/585,812

(22) Filed: Feb. 23, 2024

(65) Prior Publication Data

US 2024/0195861 A1 Jun. 13, 2024

Related U.S. Application Data

(63) Continuation of application No. 18/053,519, filed on Nov. 8, 2022, now Pat. No. 11,930,068.

(60) Provisional application No. 63/277,783, filed on Nov. 10, 2021.

(51) Int. Cl.
*H04L 67/02* (2022.01)
*G06F 9/54* (2006.01)

(52) U.S. Cl.
CPC ............... *H04L 67/02* (2013.01); *G06F 9/54* (2013.01)

(58) Field of Classification Search
CPC .............. G06F 9/45558; G06F 8/65; G06F 2009/45595; G06F 9/45533; G06F 2009/4557; H04L 67/02; H04W 4/021
See application file for complete search history.

(56) References Cited

U.S. PATENT DOCUMENTS

| | | | |
|---|---|---|---|
| 10,740,021 B1 * | 8/2020 | Patil | G06F 9/4416 |
| 11,546,349 B2 * | 1/2023 | Kuperman | H04W 12/069 |
| 2010/0107162 A1 | 4/2010 | Edwards et al. | |
| 2014/0032531 A1 | 1/2014 | Ravi et al. | |
| 2019/0075154 A1 | 3/2019 | Zhang et al. | |
| 2019/0243671 A1 * | 8/2019 | Yadav | G06F 9/45533 |

(Continued)

OTHER PUBLICATIONS

International Search Report and Written Opinion of the International Searching Authority, dated Nov. 11, 2021, from corresponding International Application No. PCT/US2022/079541.

(Continued)

*Primary Examiner* — Chirag R Patel
(74) *Attorney, Agent, or Firm* — JPMORGAN CHASE BANK, N.A.

(57) ABSTRACT

Systems and methods for providing stateless management of a virtualization platform are disclosed. In some aspects, the techniques described herein relate to a method including: listening, at an agent executing on a host machine of a plurality of host machines that include a cluster for hosting virtual machines, for an event triggered on a virtual machine manager associated with the agent; determining, by the agent and based on the event, parameters needed for an API call at a central management service that manages a plurality of virtual machines and virtual machine managers; sending a Hypertext Transfer Protocol (HTTP) request to the central management service, wherein the parameters are included in the HTTP request; receiving, by the agent and from the central management service, a response to the HTTP request including return data based on the determined parameters and the API call.

14 Claims, 5 Drawing Sheets

(56) References Cited

U.S. PATENT DOCUMENTS

| | | | |
|---|---|---|---|
| 2019/0342229 A1* | 11/2019 | Khinvasara | H04L 41/0896 |
| 2020/0195494 A1* | 6/2020 | Johnsen | H04L 41/0803 |
| 2021/0133328 A1* | 5/2021 | Wu | G06F 8/65 |
| 2021/0409377 A1* | 12/2021 | Hohne | H04W 12/06 |

OTHER PUBLICATIONS

Anonymous: "Azure-Architect-Exam-Study-Material/Compute.md at master vaquarkhan/Azure-Architect-Exam-Study-Material GitHub", Jun. 27, 2018 (Jun. 27, 2018).

Ankitaduttamsft: "Hyper-V disaster recovery architecture in Azure Site Recovery—Azure Site Recovery I Microsoft Learn", learn.microsoft.com/, Jul. 11, 2022 (Jul. 11, 2022), pp. 1-9.

\* cited by examiner

SYSTEMS AND METHODS FOR STATELESS MANAGEMENT OF A VIRTUALIZATION PLATFORM

RELATED APPLICATIONS

This application is a continuation of U.S. patent application Ser. No. 18/053,519 filed Nov. 8, 2022, which claims the benefit of U.S. Provisional Patent Application Ser. No. 63/277,783, filed Nov. 10, 2021, the disclosure of each of which is hereby incorporated, by reference, in its entirety.

BACKGROUND

1. Field of the Invention

Aspects generally relate to providing stateless management of a virtualization platform.

2. Description of the Related Art

Conventional virtual machine (VM) management tools manage virtualization assets with an active and stateful approach. This approach has a central management element that actively communicates with managed assets to gather information or instructs the assets to perform actions. The central management element "pushes" actions to be performed to managed agents. This can be problematic in organizations with sophisticated technical environments that restrict data flows into and out of the organization at a firewall level for security reasons. For instance, when organizations restrict ports and protocols at the firewall level, connectivity issues can occur between active, stateful VM management tools and managed agents. Further, implementation delays may occur while administrators attempt to secure policies where the communication ports needed by active, stateful applications are open. If and when these policies are secured, they may expose the organization to security risks.

SUMMARY

In some aspects, the techniques described herein relate to a method including: listening, at an agent executing on a host machine of a plurality of host machines that include a cluster for hosting virtual machines, for an event triggered on a virtual machine manager associated with the agent; determining, by the agent and based on the event, parameters needed for an API call at a central management service that manages a plurality of virtual machines and virtual machine managers; sending a Hypertext Transfer Protocol (HTTP) communication to the central management service, wherein the parameters are included in the HTTP request; receiving, by the agent and from the central management service, a response to the HTTP request including return data based on the determined parameters and the API call.

In some aspects, the techniques described herein relate to a method, wherein the HTTP communication is a Hypertext Transfer Protocol Secure (HTTPS) request.

In some aspects, the techniques described herein relate to a method, wherein the HTTPS communication is transmitted via a connection established on network port 443.

In some aspects, the techniques described herein relate to a method, wherein the HTTP communication includes a GET method.

In some aspects, the techniques described herein relate to a method, wherein the parameters include a virtual machine identifier.

In some aspects, the techniques described herein relate to a method, wherein the response includes an inventory record related to the virtual machine identifier.

In some aspects, the techniques described herein relate to a method, including: determining, by the agent, a field in the inventory record that is out of date; and sending a second HTTP communication to the central management service including a parameter, wherein the parameter is an updated field for the field in the inventory record that is out of date.

In some aspects, the techniques described herein relate to a system including a host machine, an agent executing on the host machine, and a virtual machine manager executing on the host machine and associated with the agent, wherein the agent is configured to: listen for an event triggered on the virtual machine manager associated with the agent; determine parameters needed for an API call at a central management service that manages a plurality of virtual machines and virtual machine managers; send a Hypertext Transfer Protocol (HTTP) communication to the central management service, wherein the parameters are included in the HTTP request; and receive a response to the HTTP request including return data based on the determined parameters and the API call.

In some aspects, the techniques described herein relate to a system, wherein the HTTP communication is a Hypertext Transfer Protocol Secure (HTTPS) request.

In some aspects, the techniques described herein relate to a system, wherein the HTTPS communication is transmitted via a connection established on network port 443.

In some aspects, the techniques described herein relate to a system, wherein the HTTP communication includes a GET method.

In some aspects, the techniques described herein relate to a system, wherein the parameters include a virtual machine identifier.

In some aspects, the techniques described herein relate to a system, wherein the response includes an inventory record related to the virtual machine identifier.

In some aspects, the techniques described herein relate to a system, wherein the agent is configured to: determine a field in the inventory record that is out of date; and send a second HTTP communication to the central management service including a parameter, wherein the parameter is an updated field for the field in the inventory record that is out of date.

In some aspects, the techniques described herein relate to a non-transitory computer readable storage medium, including instructions stored thereon, which instructions, when read and executed by one or more computer processors, cause the one or more computer processors to perform steps including: listening, at an agent executing on a host machine of a plurality of host machines that include a cluster for hosting virtual machines, for an event triggered on a virtual machine manager associated with the agent; determining, by the agent and based on the event, parameters needed for an API call at a central management service that manages a plurality of virtual machines and virtual machine managers; sending a Hypertext Transfer Protocol (HTTP) communication to the central management service, wherein the parameters are included in the HTTP request; receiving, by the agent and from the central management service, a response to the HTTP request including return data based on the determined parameters and the API call.

In some aspects, the techniques described herein relate to a non-transitory computer readable storage medium, wherein the HTTP communication is a Hypertext Transfer Protocol Secure (HTTPS) request.

In some aspects, the techniques described herein relate to a non-transitory computer readable storage medium, wherein the HTTPS communication is transmitted via a connection established on network port 443.

In some aspects, the techniques described herein relate to a non-transitory computer readable storage medium, wherein the HTTP communication includes a GET method.

In some aspects, the techniques described herein relate to a non-transitory computer readable storage medium, wherein the parameters include a virtual machine identifier.

In some aspects, the techniques described herein relate to a non-transitory computer readable storage medium, wherein the response includes an inventory record related to the virtual machine identifier, and including: determining, by the agent, a field in the inventory record that is out of date; and sending a second HTTP communication to the central management service including a parameter, wherein the parameter is an updated field for the field in the inventory record that is out of date.

In some aspects, the techniques described herein relate to a method, including: receiving, at a central management service, a first HTTP communication including an HTTP method and data parameters, wherein the data parameters include a virtual machine identifier; determining, based on the HTTP method and the data parameters, a database query; executing the database query against an inventory database, wherein the database query includes the virtual machine identifier as a lookup key, and wherein the database query returns data fields related to the virtual machine identifier; and including, in a reply HTTP communication, the data fields related to the virtual machine identifier;

In some aspects, the techniques described herein relate to a method, including: providing an agent and a security certificate at a host server; storing the security certificate in a local certificate store of the host server; retrieving, by the agent, the security certificate; creating a payload and signing the payload with a signature of the security certificate; including the payload as a parameter of an HTTP communication; sending the HTTP communication to an authorization service; validating, by the authorization service, the signature of the security certificate; sending, in a return HTTP communication, a bearer token to the agent; including, in a second HTTP communication directed to a central management service, the bearer token; and validating, by the central management service, the bearer token with an associated public key stored at the authorization service.

DETAILED DESCRIPTION

Figure 1:
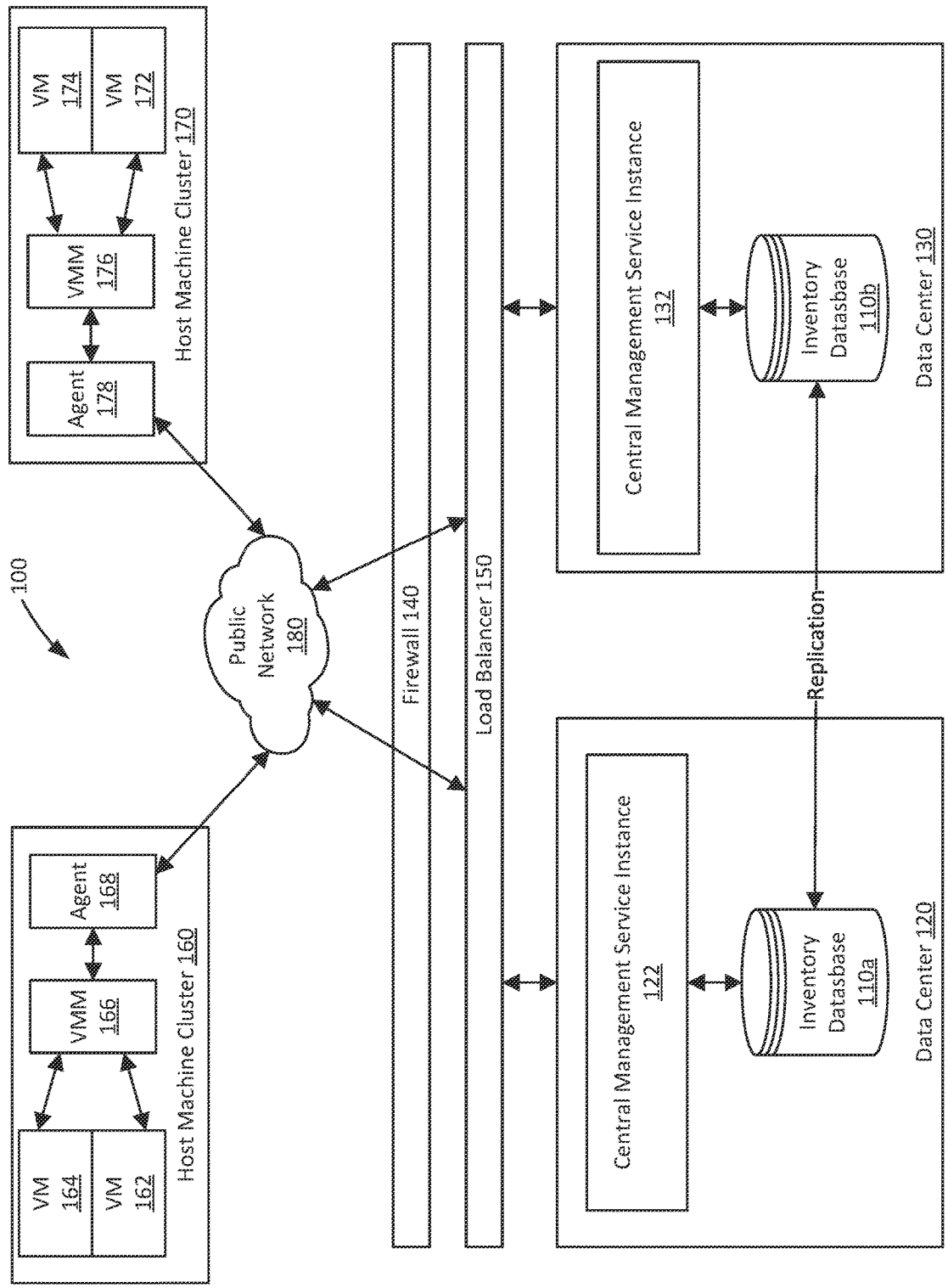
FIG. 1 is a block diagram of a system for providing stateless management of a virtualization platform, in accordance with aspects.

Aspects are directed to providing stateless management of a virtualization platform.

In accordance with aspects, hypervisor management paradigms may be reversed by configuring agents executing on VM hosts to initiate communication with a central management service in a stateless manner and using standard HTTP or HTTPS protocols and ports. In accordance with aspects, a central management service may passively receive requests from the agents in a stateless manner over the Hypertext Transfer Protocol (HTTP) or Hypertext Transfer Protocol Secure Protocol (HTTPS) and corresponding ports.

Advantages realized through aspects, include limiting a number of internet protocol (IP) addresses that may pass traffic through an organization's firewalls. Further, agents may connect to a central management service via proxy points (e.g., proxy servers) utilizing HTTP and/or HTTPS and corresponding ports. Domain restrictions may also be eliminated, thereby allowing agents to exist on assets on varying domains or non-domain joined assets, because the agents only need to have trusted access to the central management service via HTTP and/or HTTPS protocols/ports.

A virtual machine monitor (VMM), also commonly referred to as a hypervisor or virtualizer, is computer software, firmware and/or hardware that creates and/or manages virtual environments on physical computers. The physical computer with its corresponding hardware resources (e.g., processors, random access memory (RAM), persistent storage, etc.) may be referred to as a host machine, a host computer, a host server, etc. The VMM virtualizes the hardware resources of the host machine and provides a virtual operating platform for the operating system of a VM.

Generally, multiple VMs may be managed by a VMM and the VMM may allocate hardware resources of a host machine to each VM executing on a host. Further, a VMM (or multiple of instances of a VMM) may manage the hardware resources of multiple physical host machines for use by multiple VMs. Multiple hosts managed by a VMM, or multiple instances of a VMM, are referred to as clusters of host machines. Clusters allow for pooling of the hardware resources of multiple host machines.

In accordance with aspects, a VMM may include an agent configured to initiate stateless communication with a central management service using HTTP and/or HTTPS protocols and ports. The agent may be a service or a sub-service of a VMM and each host or host cluster may execute an instance of the agent. An agent may initiate communication with the central management service using, e.g., HTTPS protocol on port 443. Some aspects may not require a standing connection for an agent to initiate communication with the central management service, or to receive a response to the initiated communication via the same port and protocol. Some aspects, however, may utilize a standing connection if one is established. For instance, aspects may attempt to establish a WebSocket connection in an initial HTTP handshake to utilize bidirectional communications provided through the WebSocket protocol. If, however, a WebSocket connection cannot be established, communication may take place over HTTP requests and corresponding responses.

Bidirectional protocols, such as WebSockets introduce a new layer in the communication process that may uses a 3rd party library to facilitate real-time bi-directional communication between an Agent and an instance of the central management service. Such protocols still utilize HTTP, but instead of making multiple GET, POST, PATCH, DELETE requests, these protocols make a single SOCKET request and hold the connection open to allow messages to be passed back and forth via the open connection. The connections, however, remain stateless in the sense that at any given time the connection can drop and reconnect somewhere else and the agent can continue where it was interrupted. Instead of having the overhead of creating a new connection for each request, however, the initial connection can be used so long as it remains open. Bidirectional protocols also offer the additional benefit of allowing actions on the agent to be invoked (e.g., as when creating a new VM) without having to wait for the agent to first establish a connection to the central management service.

In accordance with aspects, the agent may send communications back to a central management service that persistently stores inventory data in a central datastore. The datastore may be, e.g., a relational database, a flat file architecture, or any other suitable type of datastore.

The central management service and the datastore may be cloud based and may be behind a firewall and/or a load balancer. The firewall may be configured to allow inbound traffic on port 443 or port 80 (i.e., the ports defined for HTTPS and HTTP traffic, respectively). The load balancer may forward inbound traffic from port 443 or port 80 to the central management service. In accordance with aspects, multiple load balancers may be used to route incoming traffic. A first load balancer may be a global load balancer and may work in conjunction with a domain name system (DNS) server for the central management service. The first load balancer may monitor downstream pools of services, including the central management service, in different datacenters. When a client queries the DNS server for an IP address of the central management service, the DNS server will redirect the request to the first global load balancer, which will return to the client the internet protocol (IP) address of the geographically closest pool. The global load balancer, in turn, will then respond to the request with the IP address of the geographically closest service pool for the central management service. A second load balancer may be a logical load balancer that is part of the software-defined network stack for each service pool. When the request is received, the second load balancer can route the request to the correct container in a virtualized pool of central management service instances based on the URL for the request. For instance, the host portion of a URL may be used to correctly route a request. Exemplary URLs including virtual container identifiers may be in the format vm-api.cloudlocation.high-level-domain.net routes to a consumer API container for request processing, whereas vm-relay.cloud-domain.high-level-domain.net routes to an agent API container for request processing.

The central management service may provide an application programming interface (API) that exposes methods that may be called by the agents. An exemplary API architecture is a REST (Representational State Transfer) API architecture. The methods may require certain data parameters be provided by the calling agents. Once called by an agent, the method may pass the parameterized data in the called method to the central management service for processing of the data. In response to the API method being called by an agent, the central management service may return data to the calling agent. The returned data may be based on the method that was called and the data that was received as parameters of the called method.

For example, an agent may initiate communication with the central management service using the HTTPS protocol. The communication may be in the form of available/suitable HTTPS methods, such as GET, POST, PATCH, DELETE, etc. Parameters required for an API call of the central management service's API may be passed in the URL portion of the HTTPS methods or in the body of the request, depending on the method. Return data expected by the agent may be included in the return HTTPS message from the central management service. An exemplary communication interaction may consist of the initial request and the response. An agent operation may consist of a single communication interaction, or several communication interactions in a series.

For instance, an agent may send a periodic "register" communication to the central management service so that processes of the central management service are periodically updated with the agent's registration details. In accordance with aspects, a register process may include the agent sending a HTTPS POST to relay/api/AgentRegistration/Register( )" with its "AgentRole", "HostName", and "PublicCertificate" as parameters embedded in the body of the HTTPS universal resource locator (URL). The API of the central management service may receive the parameters via port 443 and do create, read, update, and delete (CRUD) operations on an inventory database based on the received parameters. For example, the central management service may update a record for the agent having received a "HostName" parameter in the inventory database and return the agent's "ID" in a response message. Receipt of the agent's ID by the agent via the return communication from the central management service may indicate to the agent that the registration communication was received and properly processed by the central management service and may complete the interaction.

Each communication with the API may follow a similar flow or pattern. An agent may send an HTTPS Request (GET, POST, PATCH, DELETE, etc.) with parameters embedded in either the body or in the URL of the request and the server may return data or an empty success response depending on the request or called method.

In accordance with aspects, more complex operations, such as an inventory update may include a series of calls from the agent and corresponding responses from the central management service. For instance, to update an inventory for a VirtualMachine, the agent may request the current record via a bi-directional connection established in an initial HTTP request that upgrades the HTTP connection for use with one or more bidirectional protocols such as WebSockets, Server-Sent events, and/or Long Polling. A message may then be generated by an agent to request inventory data of an associated VM, the message may be serialized as a JSON string and sent to the central management service. The message may then be deserialized and a query created based on the message parameters and executed against the database. The results of the query are then crafted into a reply, serialized, and returned to the agent.

In circumstances where bidirectional communication is not available, traditional HTTP methods, such as a GET method (e.g., GET/VirtualMachine?$filter=Name eq 'VMName') and the full record definition may be returned to the agent by the central management service. The agent can then compare the inventory record received from the central management service to its local inventory record polled from the relevant VM. If updates need to be made, the agent may make a second call to update the central management service.

In aspects using asynchronous HTTP methods, an update call may be in the form of a PATCH method. For example, PATCH/VirtualMachine/[ID], where ID is an identifier of the relevant VM. The identifier may be a lookup key for querying records in a database maintained by the central management service. Exemplary identifiers include a unique ID such as a VM name. The agent may respond with only the properties to be updated in the body of the request. That is, only the properties that are different from those received in the initial response from the central management service. Upon receiving the properties, the central management service may update an inventory database with an update command (e.g., a structured query language (SQL) update command) and send a response to the agent including the updated record.

In aspects using bidirectional communication, an update call and its associated parameters may be serialized to a JSON string and sent over, e.g., a WebSockets connection initiated via an HTTP request, as described, above.

In accordance with aspects, agent requests may be serviced by multiple data centers. Moreover, a complex operation made up of several communications may also be serviced by multiple data centers. Aspects may include instances of a central management service at multiple data centers. Each instance may receive requests from a load balancer. The load balancer may determine a different instance of the central management service is appropriate to direct a communication to, even if the communication is part of a complex operation involving multiple communications. This flexibility may be accomplished using a database cluster that replicates the inventory database at each data center. Because each communication (even in a complex operation) includes only an HTTP request from an agent and a single response from a central management service instance, complex communications can remain stateless. This remains true even for requests where a bi-directional (e.g., WebSockets) connection is established, because these protocols are extensions of HTTP, and are single long running HTTP requests where data is streamed back and forth. When these connections close it is a similar scenario as if an HTTP POST or HTTP GET completed.

For instance, an agent request for a VM's current inventory record may be sent to a first central management service instance in a first data center, and the first central management service may query its local instance of the inventory database and return the requested record. If it is determined that an update is need, it is not necessary that the first instance of the central management service make the database update, and the load balancer may send the update request to the most appropriate instance of the central management service (e.g., a second instance of the central management service that may have a lighter workload than the first instance).

In accordance with aspects, several API calls/methods may be made available to agents for diverse and scalable functionality: Capacity EP, Repave Eligibility EP; Create VM EP, Delete VM EP, Repave EP; VMM Maintenance EP (patching, maintenance, VMM pave/repave); VMM Networking EP (VSwitch Creation, JNet/NETID integrated), etc.

Actions portions: right now it just asks for values and statuses. Next will be creating new VMs in a stateless orchestration. Agent reaches out and asks what needs to be done next in provisioning.

In accordance with aspects, new virtual machines can be created in a stateless orchestration using the techniques described herein. For instance, in creating a new virtual machine, a request may be received by the central management service, including parameters, where the received parameters indicate that a new VM creation operation is desired. Because creating a virtual machine may take several steps, an agent may be configured, as part of a VM creation process, to send messages to the central management service indicating a list of completed steps in the creation process. The central management service may parse the completed steps, and provide data for an appropriate next step in the VM creation process. Alternatively, in aspects where bidirectional communication has been established, the central management service may receive the request to create a VM from the agent and may generate a return message including a "create" commend that creates the VM. The central management service may serialize the message and send it to the agent. The agent may respond that it has received and initiates the creation of the VM. The agent may then create the VM (e.g., by passing the create commend to its associated VMM) based on information in the return request, once complete the agent generates a second message and sends it to the central management service with a "success" parameter, where the success parameter indicates a successful creation of the VM.

In accordance with aspects, the agent may communicate with a proxy server, and the proxy server may forward communications to the central management service. This is particularly beneficial in geographic regions where internet access and different ports and protocols are highly regulated by states.

In accordance with aspects, an agent may perform inventory of VMMs and inventory of running VMs and report this data to the central management service for persistence of inventory records. In aspects, an agent may provide real time data for repaves and capacity analysis (via quick polling, i.e., near real-time polling). Agents may further provide performance data related to hosts and clusters and place this data on a messaging data bus for consumption by other systems. As used herein, a pave is the creation of a novel (i.e., never-before seen) OS instance, whether it's a physical computer or a virtual machine. This isn't just creating a VM, but also registering it with all the firm's various management systems. A repave is taking an existing OS instance and then recreating it. Each process involves a wider orchestration of systems of which WVM is a part of.

In accordance with aspects, an agent may make HTTP (S)-based API calls to the central management service based on instruction from its corresponding VMM. Such actions may include VM creation instructions, VM management actions, managing host/VM configurations, maintaining configuration drift, etc. Exemplary VM management actions may include: VM creation, VM deletion, adjust CPU count, adjust memory amount, add disk, remove disk, adjust disk size, power on VM, power off VM, place a host in maintenance and remove a host from maintenance. Agent actions may be event driven to perform actions based on identified events. For instance, an agent may "listen" for specified event by registering with the OS and listening for events such as VM state changes. When these events are triggered, the agent would then send a PATCH request to the API to update the record. An agent may register with a VMM to listen for events in the virtualization namespace, and when an event is triggered, a delegate may be called that would request the current record from the API and then request the update.

In accordance with aspects, an agent may be included in an image for an initial virtual environment that is created on a host.

In accordance with aspects, each provided/exposed API call may have a role created and assigned to it. Roles can be granular in that specific administrative teams can have access to only attributes or objects within the capabilities of the assigned API call (e.g., a first administrative team can perform actions on the first team's assigned VMs only). The central management service may have a security subsystem that handles authorization. Specific API calls and records may be restricted to certain roles via the security subsystem. Once access is provided to the groups that have VMs on an infrastructure, this will allow them, for example, to power off one of their VMs, but not another tenant's VM.

In accordance with aspects, techniques described herein may be configured as domain-agnostic using certificate-based authentication. Such a configuration allows for operations to be performed on a non-domain joined host. When an agent is installed on a host machine, it may be configured to run as a service as the local system. As a local service on the host machine, the agent may have access to memory management and collection inventory on the host machine. Configuration as a local service allows the agent to perform local functions but does not give the agent access outside of the local host system.

In accordance with aspects, to allow an agent to perform calls to the central management service API on a non-domain joined host, a security certificate may be generated by an agent and stored in a host's local certificate store. When the agent makes an initial call to the central management service, the agent may include its associated certificate along with a public key for the certificate as a parameter. The central management service may then store the certificate and uses it for validation of subsequent requests from the agent to the central management service by using the public key to validate authorization tokens sent by the agent that are signed with the certificate's private key. The agent will periodically create a new certificate and update the central management service with a new public key.

When bidirectional communication is not established (i.e., when communication is undertaken via a series of HTTP requests from an agent and responses from the central management service), the agent may create a payload, sign the payload with the security certificate, and send the payload to an authorization service. The authorization service may validate the signature of the signed payload and return a bearer token, which contains information such as assigned roles. The authorization service may be a third-party service (for instance, if the security certificate is not self-signed, the authorization service may offer and validate the signature). The agent can then make an HTTP request to the central management service API including the token in the header of an HTTPS request. The central management service may then use the bearer token to set permissions for users and groups of users at the central management service. For instance, the roles defined in the bearer token may be the basis for setting access permissions for different VMs, administration permissions for different VMs, etc.

In scenarios where bi-directional communication has been established, and/or where an organization self-signs its own security certificates, the agent may send the authorization token directly to the central management service. The central management service may then look up the public key stored with a local authorization service and use the public key to validate the token and receive access roles for users and user groups.

For either traditional HTTP communications, or where bidirectional communication is established via HTTP, once a security certificate has been validated and access permissions/roles have been received, the central management service may take the permissions/roles and provide them to a security subsystem of the central management service. The roles, permission may be used to authorize operational requests from agents where the operational requests include the security certificate that corresponds with the received permissions/roles.

FIG. 1 is a block diagram of a system for providing stateless management of a virtualization platform, in accordance with aspects. System 100 includes host machine cluster 160 and host machine cluster 170. Host machine cluster 160 and host machine cluster 170 may be one or more physical server computers configured to host a virtual machine environment. Host machine cluster 160 and host machine cluster 170 may be configured as a server cluster and may be in different data centers, where the different data centers are in operative communication with each other via public network 180.

Host machine cluster 160 and host machine cluster 170 are each configured with a virtual machine manager, VMM 166 and VMM 176, respectfully. VMM 166 and VMM 176 represent virtual machine managers, as discussed herein. VMM 166 and VMM 176 manage virtual machines deployed to host machine cluster 160 and host machine cluster 170, respectively. VMM 166 manages virtual machines VM 164 and VM 162. VMM 176 manages virtual machines VM 174 and VM 172. VMM 166 and VMM 176 may perform management operations such as allocating hardware resources from their respective host clusters, monitor and record the status and resource usage of virtual machines, and communicate with a deployed agent.

Host machine cluster 160 and host machine cluster 170 further include agent 168 and agent 178, respectively. Agents 168 and 178 are agents of a central management service, as discussed herein. Agents 168 and 178 are configured to be in operative communication with VMMs 166 and 176, respectively. Agent 168 and agent 178 may send parameterized data provided by VMM 168 and VMM 178 (respectively) to a central management service via HTTP or HTTPS methods and may receive HTTP(S) responses with additional data from the central management service. Agents 168 and 178 may include listeners that listen for communications from their respective VMM, and also may be configured to query their respective VMM for data via API calls or other methods.

System 100 further includes data center 120 and data center 130. Data center 120 includes central management service instance 122 operating/executing thereon. Data center 130 includes central management service instance 132 operating/executing thereon. Data centers 120 and 130 are behind firewall 140 and load balancer 150. Firewall 140 is configured to let incoming HTTP and/or HTTPS traffic pass through on ports 80 and 443 (respectively), so that HTTP(S) traffic from agents 168 and 178 can reach load balancer 150. Load balancer 150 receives HTTP(S) traffic from agents and determines an appropriate instance of a central management service to forward the traffic to.

Data center 120 additionally includes inventory database 110a. Data center 130 includes inventory database 110b. Inventory database 110a and inventory database 110b are configured to store inventory configurations from virtual machines as sent by agents. Inventory database 110a and inventory database 110b may be configured as part of a distributed database cluster that manages replication and change management among database members of the cluster. Updates to any database member in the cluster may be replicated to each other member, so that each database in the cluster has the latest version of data.

Figure 2:
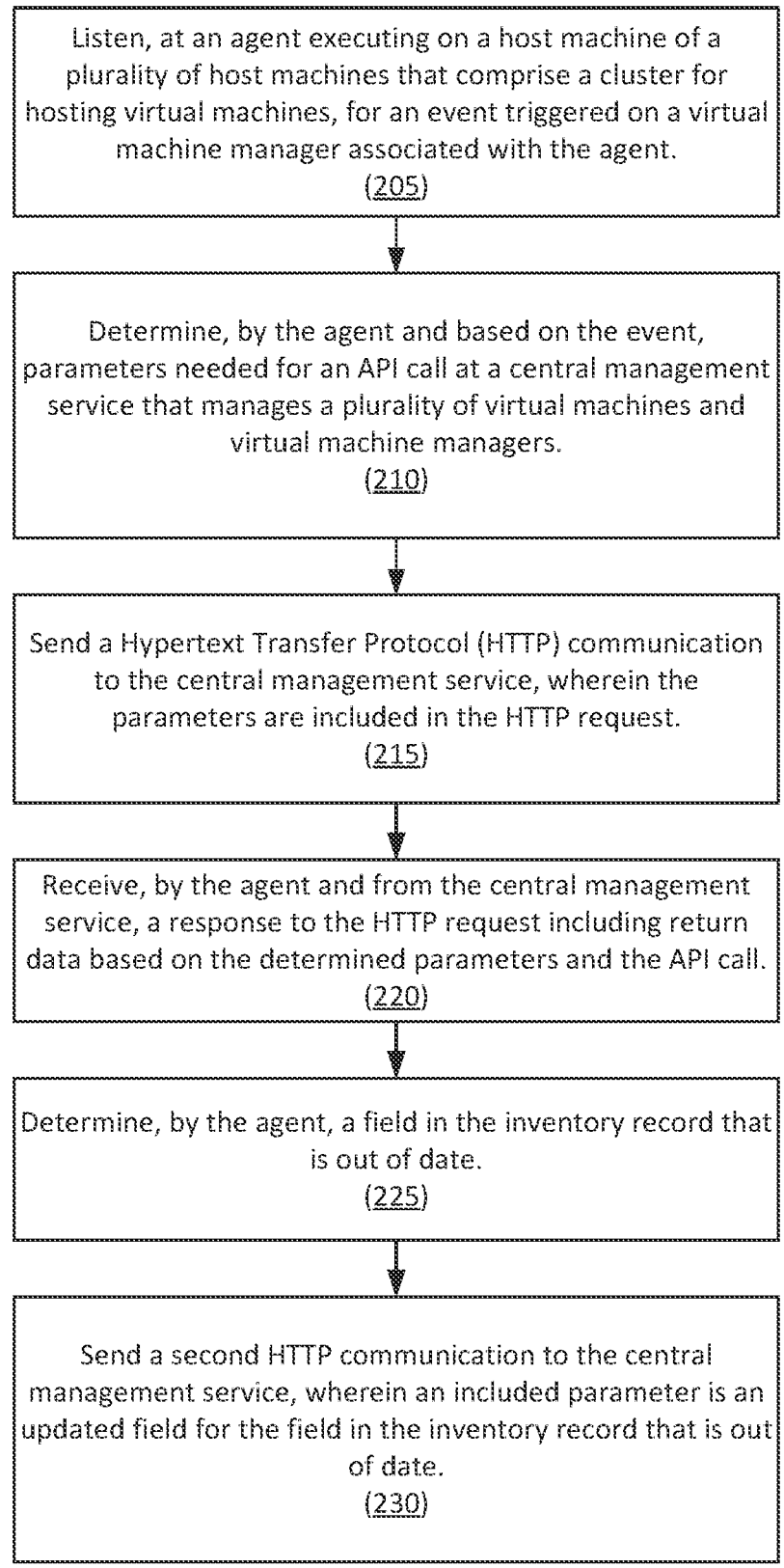
FIG. 2 is a logical flow chart for stateless management of a virtualization platform, in accordance with aspects.

FIG. 2 is a logical flow chart for stateless management of a virtualization platform, in accordance with aspects.

Step 205 listening, at an agent executing on a host machine of a plurality of host machines that comprise a cluster for hosting virtual machines, for an event triggered on a virtual machine manager associated with the agent.

Step 210 includes determining, by the agent and based on the event, parameters needed for an API call at a central management service that manages a plurality of virtual machines and virtual machine managers.

Step 215 includes sending a Hypertext Transfer Protocol (HTTP) communication to the central management service, wherein the parameters are included in the HTTP request.

Step 220 includes sending a Hypertext Transfer Protocol (HTTP) communication to the central management service, wherein the parameters are included in the HTTP request.

Step 225 includes determining, by the agent, a field in the inventory record that is out of date.

Step 230 includes sending a second HTTP communication to the central management service, wherein an included parameter is an updated field for the field in the inventory record that is out of date.

Figure 4:
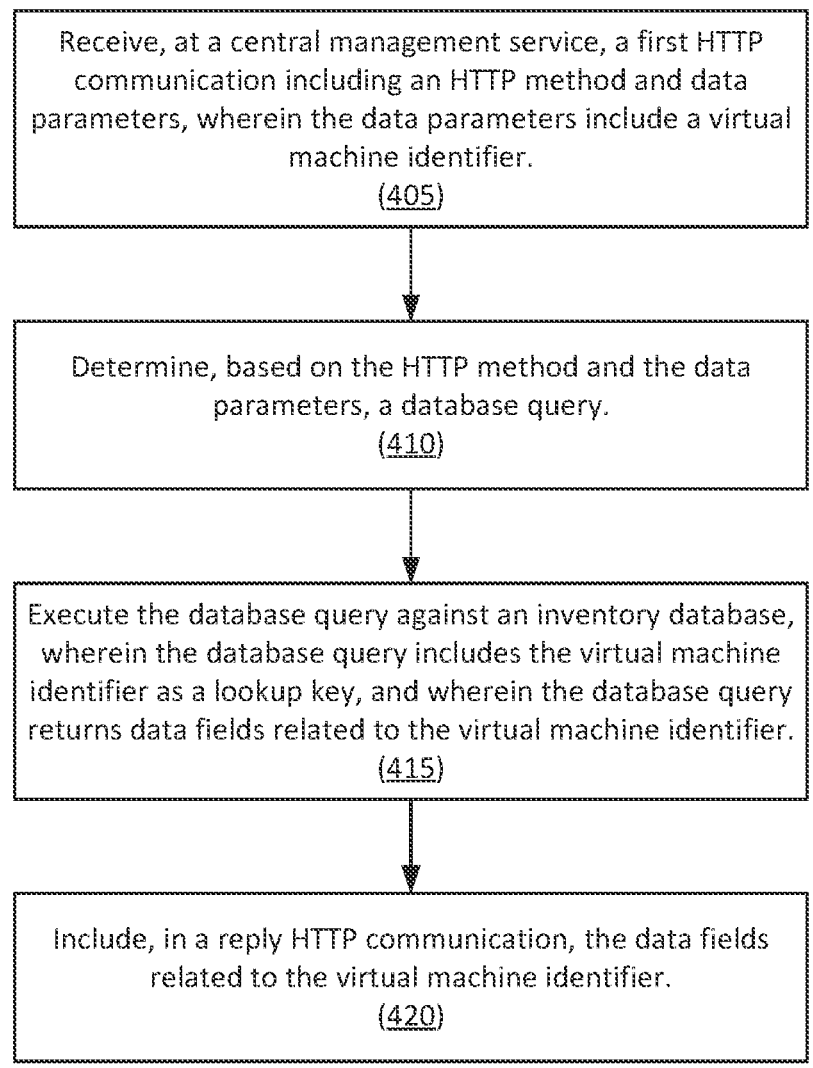
FIG. 4 is a logical flow chart for stateless management of a virtualization platform, in accordance with aspects.

FIG. 4 is a logical flow chart for stateless management of a virtualization platform, in accordance with aspects.

Step 405 includes receiving, at a central management service, a first HTTP communication including an HTTP method and data parameters, wherein the data parameters include a virtual machine identifier.

Step 410 includes determining, based on the HTTP method and the data parameters, a database query.

Step 415 includes executing the database query against an inventory database, wherein the database query includes the virtual machine identifier as a lookup key, and wherein the database query returns data fields related to the virtual machine identifier.

Step 420 includes including, in a reply HTTP communication, the data fields related to the virtual machine identifier.

Figure 5:
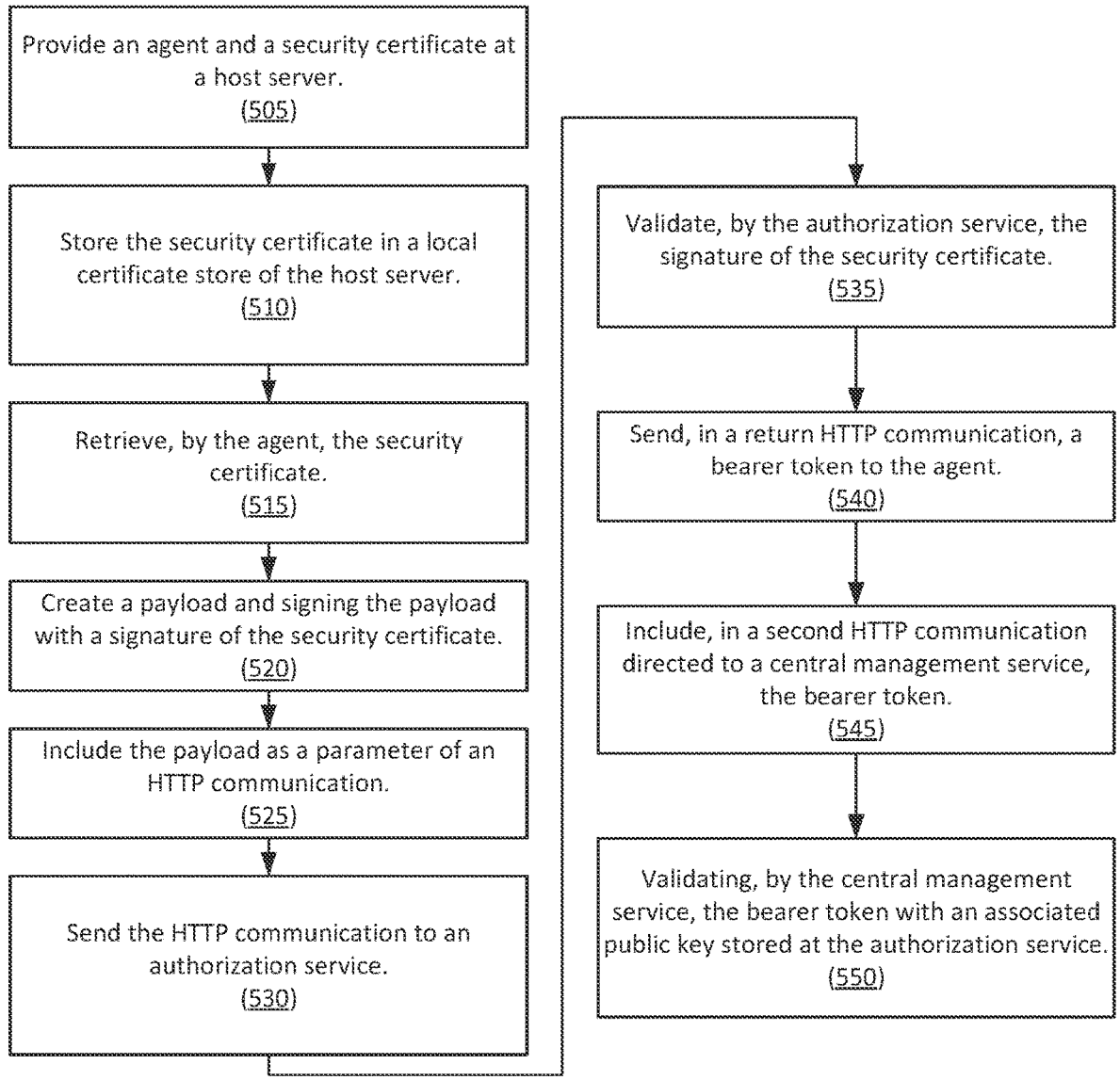
FIG. 5 is a logical flow chart for stateless management of a virtualization platform, in accordance with aspects.

FIG. 5 is a logical flow chart for stateless management of a virtualization platform, in accordance with aspects.

Step 505 includes providing an agent and a security certificate at a host.

Step 510 includes storing the security certificate in a local certificate store of the host server.

Step 515 includes retrieving, by the agent, the security certificate.

Step 520 includes creating a payload and signing the payload with a signature of the security certificate.

Step 525 includes including the payload as a parameter of an HTTP communication.

Step 530 includes sending the HTTP communication to an authorization service.

Step 535 includes validating, by the authorization service, the signature of the security certificate.

Step 540 includes sending, in a return HTTP communication, a bearer token to the agent.

Step 545 includes including, in a second HTTP communication directed to a central management service, the bearer token.

Step 550 includes validating, by the central management service, the bearer token with an associated public key stored at the authorization service.

Figure 3:
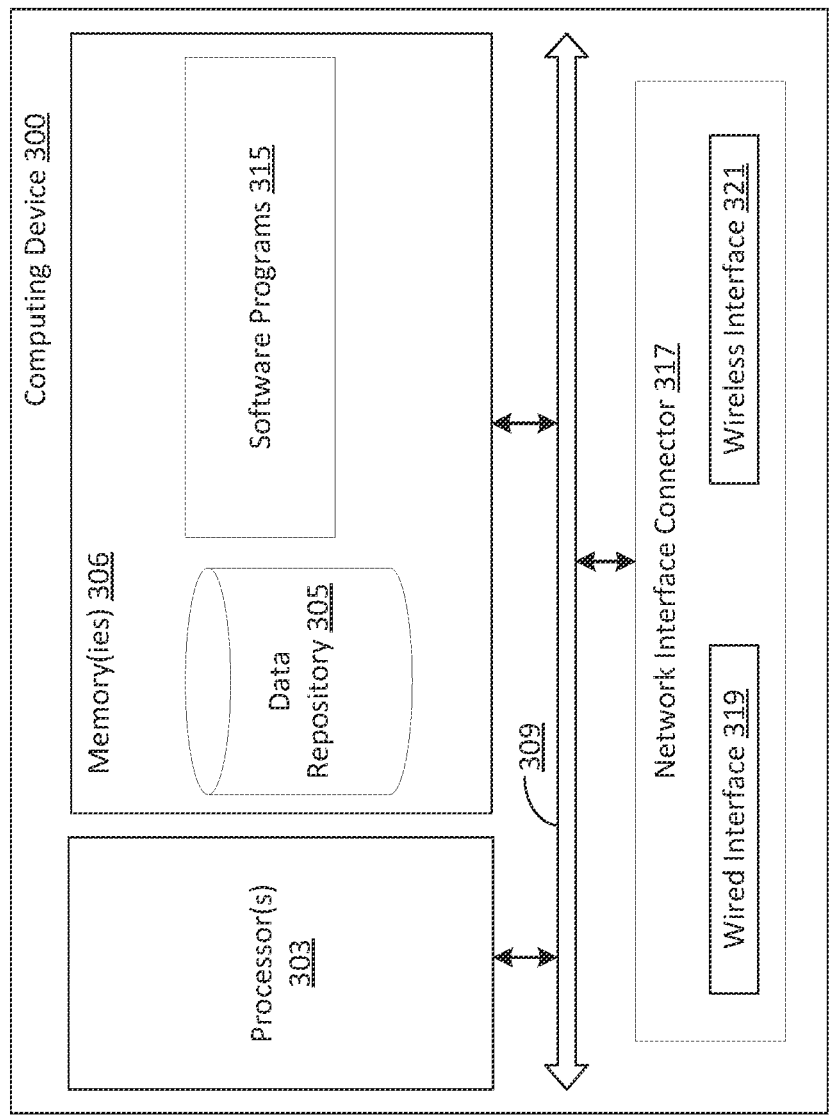
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such a host machine or a cluster of host machines, a central management service, an authorization service, etc., may include, and/or execute on, components and configurations like, or similar to, computing device 300. Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a micro-processor and/or in the form of statically or dynamically programmed electronic circuitry.

Hereinafter, general aspects of implementation of the systems and methods of the invention will be described.

The system of the invention or portions of the system of the invention may be in the form of a "processing machine" or a "computing device" such as a general-purpose computer, a computer server, a host machine, etc. As used herein, the term "processing machine" or "computing device" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
receiving, at a central management service, a first HTTP communication including an HTTP request, wherein the first HTTP communication includes an HTTP method passed in a universal resource locator ("URL") of the first HTTP communication;
receiving, at the central management service, data parameters, wherein the data parameters include a virtual machine identifier, wherein the data parameters are received as parameters of the HTTP method;
determining, by the central management service and based on the data parameters, a database query, wherein determining the database query is further based on the HTTP method;
executing the database query against an inventory database, wherein the database query includes the virtual machine identifier as a lookup key, and wherein the database query returns data fields related to the virtual machine identifier;
including, in a reply communication, the data fields related to the virtual machine identifier, wherein the reply communication is a reply HTTP communication; and
upgrading, by the first HTTP communication, an HTTP connection to the central management service to use a bidirectional protocol.

2. The method of claim 1, wherein the data fields related to the virtual machine identifier are inventory records related to the virtual machine identifier.

3. The method of claim 1, wherein the bidirectional protocol is WebSockets.

4. The method of claim 2, wherein the data parameters are serialized as a JSON string; and comprising:
serializing, by the central management service, the data fields related to the virtual machine identifier for inclusion in the reply communication.

5. The method of claim 1, comprising:
receiving, by the central management service and from a virtual machine monitor agent, a second HTTP communication, wherein the second HTTP communication includes the virtual machine identifier and an update inventory data parameter; and
updating, by the central management service, an inventory database record that is related to the virtual machine identifier with the update inventory data parameter.

6. A system comprising at least one computer including a processor and a memory, wherein the at least one computer is configured to:
receiving, at a central management service, a first HTTP communication including an HTTP request, wherein the first HTTP communication includes an HTTP method passed in a universal resource locator ("URL") of the first HTTP communication;
receiving, at the central management service, data parameters, wherein the data parameters include a virtual machine identifier, wherein the data parameters are received as parameters of the HTTP method;
determining, by the central management service and based on the data parameters, a database query, wherein determining the database query is further based on the HTTP method;
executing the database query against an inventory database, wherein the database query includes the virtual machine identifier as a lookup key, and wherein the database query returns data fields related to the virtual machine identifier;
including, in a reply communication, the data fields related to the virtual machine identifier, wherein the reply communication is a reply HTTP communication; and
upgrading, by the first HTTP communication, an HTTP connection to the central management service to use a bidirectional protocol.

7. The system of claim 6, wherein the data fields related to the virtual machine identifier are inventory records related to the virtual machine identifier.

8. The system of claim 6, wherein the bidirectional protocol is WebSockets.

9. The system of claim 7, wherein the data parameters are serialized as a JSON string; and wherein the at least one computer is configured to:
serializing, by the central management service, the data fields related to the virtual machine identifier for inclusion in the reply communication.

10. The system of claim 6, comprising:

receiving, by the central management service and from a virtual machine monitor agent, a second HTTP communication, wherein the second HTTP communication includes the virtual machine identifier and an update inventory data parameter; and updating, by the central management service, an inventory database record that is related to the virtual machine identifier with the update inventory data parameter.

11. A non-transitory computer readable storage medium, including instructions stored thereon, which instructions, when read and executed by one or more computer processors, cause the one or more computer processors to perform steps comprising:

receiving, at a central management service, a first HTTP communication including an HTTP request, wherein the first HTTP communication includes an HTTP method passed in a universal resource locator ("URL") of the first HTTP communication;

receiving, at the central management service, data parameters, wherein the data parameters include a virtual machine identifier, wherein the data parameters are received as parameters of the HTTP method;

determining, by the central management service and based on the data parameters, a database query, wherein determining the database query is further based on the HTTP method;

executing the database query against an inventory database, wherein the database query includes the virtual machine identifier as a lookup key, and wherein the database query returns data fields related to the virtual machine identifier;

including, in a reply communication, the data fields related to the virtual machine identifier, wherein the reply communication is a reply HTTP communication; and upgrading, by the first HTTP communication, an HTTP connection to the central management service to use a bidirectional protocol.

12. The non-transitory computer readable storage medium of claim 11, wherein the data fields related to the virtual machine identifier are inventory records related to the virtual machine identifier.

13. The non-transitory computer readable storage medium of claim 12, wherein the data parameters are serialized as a JSON string; and comprising:

serializing, by the central management service, the data fields related to the virtual machine identifier for inclusion in the reply communication.

14. The non-transitory computer readable storage medium of claim 11, comprising:

receiving, by the central management service and from a virtual machine monitor agent, a second HTTP communication, wherein the second HTTP communication includes the virtual machine identifier and an update inventory data parameter; and updating, by the central management service, an inventory database record that is related to the virtual machine identifier with the update inventory data parameter.

* * * * *